(12) United States Patent
Martinez et al.

(10) Patent No.: US 12,532,142 B2
(45) Date of Patent: Jan. 20, 2026

(54) VEHICLE EXTERIOR CLOSURE SOUND AMPLIFICATION AND DIRECTIONAL SPEAKER SYSTEM

(71) Applicant: Ford Global Technologies, LLC, Dearborn, MI (US)

(72) Inventors: Victor Martinez, Novi, MI (US); Brendan F. Diamond, Grosse Pointe, MI (US); Keith Weston, Canton, MI (US); John Robert Van Wiemeersch, Novi, MI (US); Matthew Penne, Pierce, NE (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 18/599,612

(22) Filed: Mar. 8, 2024

(65) Prior Publication Data

US 2025/0287172 A1    Sep. 11, 2025

(51) Int. Cl.
| | |
|---|---|
| *H04S 7/00* | (2006.01) |
| *G06F 3/01* | (2006.01) |
| *G06F 3/16* | (2006.01) |
| *G10K 11/175* | (2006.01) |
| *H04R 5/02* | (2006.01) |
| *H04R 5/04* | (2006.01) |

(52) U.S. Cl.
CPC .............. *H04S 7/303* (2013.01); *G06F 3/017* (2013.01); *G06F 3/165* (2013.01); *G10K 11/1754* (2020.05); *H04R 5/02* (2013.01); *H04R 5/04* (2013.01); *H04R 2499/13* (2013.01); *H04S 2400/11* (2013.01); *H04S 2400/13* (2013.01); *H04S 2400/15* (2013.01)

(58) Field of Classification Search
CPC .. H04S 7/303; H04S 2400/11; H04S 2400/13; H04S 2400/15; G10K 11/1754; G06F 3/017; G06F 3/165; H04R 5/02; H04R 5/04; H04R 2499/13
See application file for complete search history.

(56) References Cited

U.S. PATENT DOCUMENTS

| | | | |
|---|---|---|---|
| 8,073,156 B2 | 12/2011 | Hutt et al. | |
| 8,848,932 B2 | 9/2014 | Poulsen et al. | |
| 9,126,526 B2 | 9/2015 | Yokoyama et al. | |
| 9,706,320 B2 | 7/2017 | Starobin et al. | |
| 11,960,787 B2 * | 4/2024 | Ann | G06V 20/56 |
| 2014/0314256 A1 | 10/2014 | Fincham et al. | |
| 2023/0140015 A1 | 5/2023 | Scalisi et al. | |

* cited by examiner

*Primary Examiner* — Andrew Sniezek

(74) *Attorney, Agent, or Firm* — Joseph Zane; Brooks Kushman P.C.

(57) ABSTRACT

Directional audio is provided to positions around the vehicle. A position mapping is stored defining information indicative of how each of a plurality of closures of a vehicle, in a plurality of positions, affects sound emanating from a plurality of speakers of the vehicle at different positions around the exterior of the vehicle. Respective locations of at least one user outside the vehicle are tracked. The position mapping is utilized to apply power levels to the plurality of speakers and positioning to the plurality of the closures to direct sound output from the speakers to the respective locations of the at least one user at a desired volume level.

20 Claims, 5 Drawing Sheets

VEHICLE EXTERIOR CLOSURE SOUND AMPLIFICATION AND DIRECTIONAL SPEAKER SYSTEM

TECHNICAL FIELD

Aspects of the disclosure generally relate to a vehicle exterior closure sound amplification and directional speaker system.

BACKGROUND

Vehicles may have speakers inside and outside the vehicle cabin. Vehicles may also have different numbers and types of closures, such as doors, windows, sunroofs, etc. Some vehicles may also have passive entry features that allow the vehicle to detect a key fob or phone in proximity to the vehicle. Further, some vehicles may also have exterior cameras that allow the vehicle to detect and track a person in proximity to the vehicle.

SUMMARY

In one or more illustrative embodiments, a method for providing audio to positions around the vehicle includes: storing a position mapping defining information indicative of how each of a plurality of closures of a vehicle, in a plurality of positions, affects sound emanating from a plurality of speakers of the vehicle at different positions around the exterior of the vehicle; tracking respective locations of at least one user outside the vehicle; and utilizing the position mapping to apply power levels to the plurality of speakers and positioning to the plurality of the closures to direct sound output from the speakers to the respective locations of the at least one user at a desired volume level.

In one or more illustrative embodiments, a vehicle for use in providing audio to positions around the vehicle includes one or more controllers configured to: store a position mapping defining information indicative of how each of a plurality of closures of the vehicle, in a plurality of positions, affects sound emanating from a plurality of speakers of the vehicle at different positions around the exterior of the vehicle, the plurality of positions including a plurality of intermediate positions between an open position and a closed position, track respective locations of at least one user outside the vehicle, and utilize the position mapping to apply power levels to the plurality of speakers and positioning to the plurality of the closures to direct sound output from the speakers to the respective locations of the at least one user at a desired volume level.

In one or more illustrative embodiments, a non-transitory computer-readable medium comprising instructions for providing audio to positions around a vehicle that, when executed by one or more controllers of the vehicle, cause the vehicle to perform operations including to store a position mapping defining information indicative of how each of a plurality of closures of the vehicle, in a plurality of positions, affects sound emanating from a plurality of speakers of the vehicle at different positions around the exterior of the vehicle, the plurality of positions including a plurality of intermediate positions between an open position and a closed position, track respective locations of at least one user outside the vehicle, and utilize the position mapping to apply power levels to the plurality of speakers and positioning to the plurality of the closures to direct sound output from the speakers to the respective locations of the at least one user at a desired volume level.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicles may have built-in speakers and as well as outlets to power add-on speakers. Surrounding many of these speakers and outlets are exterior closures such as doors, windows, frunk, liftgate, tailgate, and trunk lids. These closures may be controllable by the vehicle and/or may be positionable in open, closed, and/or any set position in-between. The positioning of the closures may be controlled to allow the sound that is produced by the speakers to be reflected towards specific positions outside of the vehicle. This reflection of sound may be used to amplify and focus the sound produced by the speakers. In some examples, the sensor suite of the vehicle may be used to identify the relative position of listeners with respect to the vehicle. The sound from the speakers may be aimed using the closures to optimize the listening experience of the listeners at those relative positions. Further aspects of the disclosure are discussed in detail herein.

Figure 1:
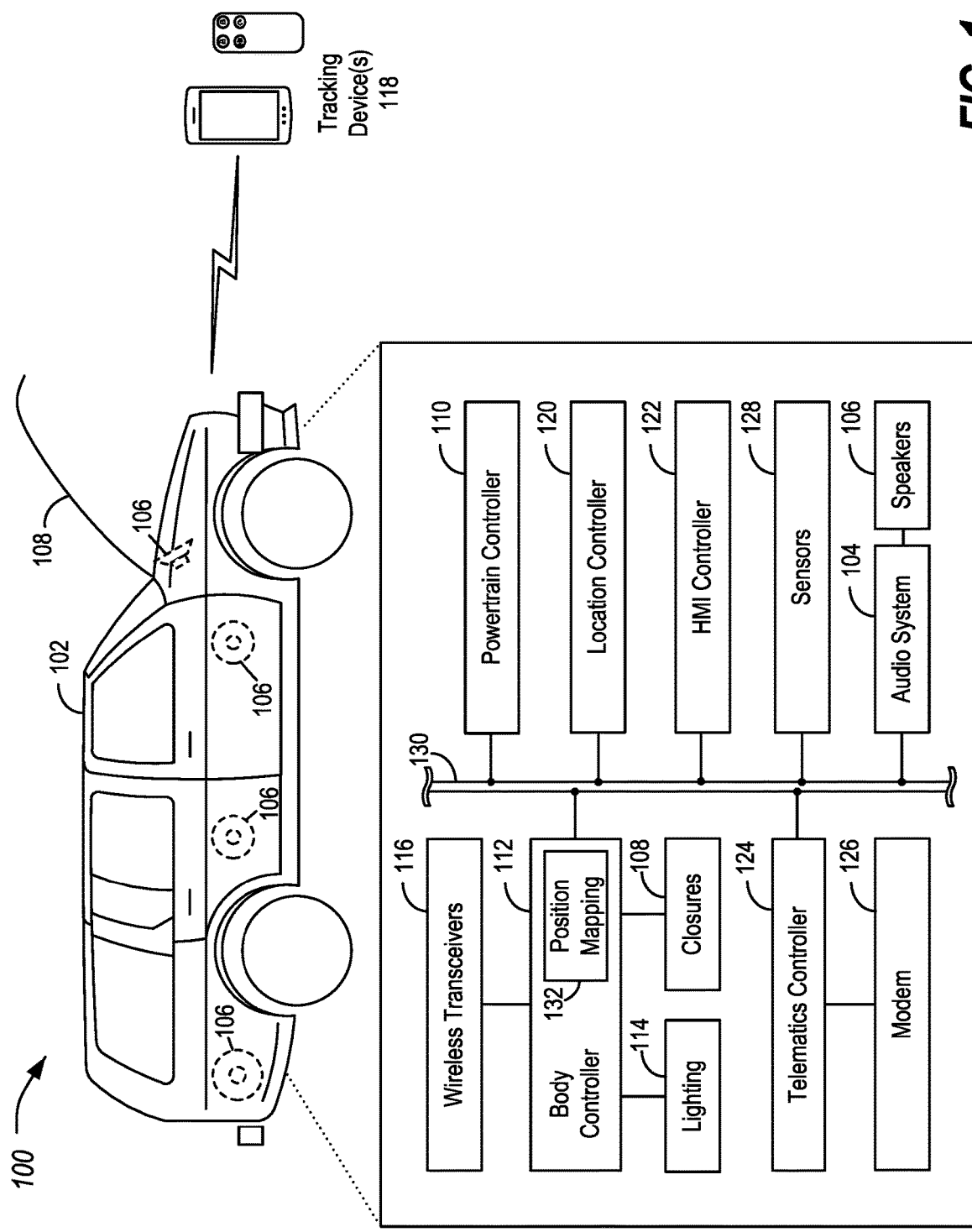
FIG. 1 illustrates an example vehicle for use in a system providing directional audio features to positions around the vehicle.

FIG. 1 illustrates an example vehicle 102 for use in a system 100 providing directional audio features to positions around the vehicle 102. The vehicle 102 may include various speakers 106 configured to convert electrical signals into audible sounds. These speakers 106 may be located within the cabin, trunk, frunk, truck bed, and other compartments of the vehicle 102. The vehicle 102 may also include various closures 108, such as doors, windows, lids, etc. configured to be controllably opened and closed to provide access to the various compartments. The vehicle 102 may also include one or more controllers configured to utilize sensors 128 to track the users. Based on the positions of the users, the one or more controllers may be configured to provide audio signals to the speakers 106 and manipulate the closures 108 to selectively direct audio in relation to the users.

As shown, the vehicle 102 is a sport utility vehicle (SUV). However, the vehicle 102 may include any of various types of automobile, crossover utility vehicle (CUV), SUV, truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may include one or more controllers configured to perform and manage various vehicle 102 functions under the power of the vehicle battery and/or drivetrain. The controllers may include various types of computing devices in support of performance of the functions of the controllers described herein. In an example, the controllers may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, JavaScript, Perl, etc.

As depicted, the example vehicle controllers are represented as discrete controllers (e.g., an audio system 104, a powertrain controller 110, a body controller 112, a location controller 120, a human machine interface (HMI) controller 122, and a telematics controller 124). However, the vehicle controllers may share physical hardware, firmware, and/or software, such that the functionality from multiple controllers may be integrated into a single controller, and that the functionality of various such controllers may be distributed across a plurality of controllers.

The audio system 104 may be configured to control various speakers 106 audible outside of the exterior of the vehicle 102. These speakers 106 may include speakers 106 that are built-into the vehicle 102, as well as speakers 106 that are add-ons that are added to the vehicle 102. As some examples, the speakers 106 may include speakers 106 within the doors of the vehicle 102, speakers 106 within the headrests or headliner of the vehicle 102, speakers 106 within the front and/or rear dash of the vehicle 102, speakers 106 within the frunk of the vehicle 102, speakers 106 within the trunk or bed of the vehicle 102, etc.

The vehicle 102 may define various closures 108 that allow for access to various compartments of the vehicle 102 in which speakers 106 are located. These closures 108 may include, as some non-limiting examples, doors to the cabin, a tailgate to the truck bed (e.g., of a truck bed covered by a tonneau cover), hoods to the trunk and/or frunk, a sunroof, a decklid, a liftgate, etc.

The powertrain controller 110 may be configured to provide control of engine operating components (e.g., idle control components, fuel delivery components, emissions control components, etc.) and for monitoring status of such engine operating components (e.g., status of engine codes).

The body controller 112 may be configured to manage the locking, unlocking of various exterior closures 108 of the vehicle 102, keyless entry, remote start, and point of access status verification (e.g., closure 108 status of the hood, doors and/or trunk of the vehicle 102). In many examples, the closures 108 may be motorized or otherwise automated. In such examples, the body controller 112 may be configured to control and/or monitor the open or closed status of the closures 108. For example, the body controller 112 may be configured to control window actuators to open or close windows of the vehicle 102. In another example, the body controller 112 may control trunk or frunk actuators to open or close the trunk lid and/or frunk lid of the vehicle 102. In yet another example, the vehicle 102 may have actuators for automatically opening and closing doors, and the body controller 112 may control the angle of the opening or closing of the doors.

The body controller 112 may also be configured to manage various other functions such as exterior lighting 114. The exterior lighting 114 may include various lights on the exterior of the vehicle 102. These may include, for example, headlights that shine forwards in front of the vehicle 102 (e.g., low and/or high beams), taillights that shine rearwards behind the vehicle 102, a center high mounted stop light (CHMSL), curtain lighting that shines to the sides of the vehicle 102, bed lights in the bed of a truck bed, and/or puddle lamps that shine downwards from under the side mirrors. Some vehicles 102 may have aimable headlights that can be steered into different directions. Also, some vehicles 102 may be equipped with dynamic light emitting diode (LED) headlights that can shape the light output. Some vehicles 102 (e.g., police cruisers or off-road vehicles 102) may also have spotlights or other aftermarket lights that may be aimable or otherwise controllable. The exterior lighting 114 of the vehicle 102 may be adjusted in orientation and intensity by the body controller 112.

The body controller 112 may be in communication with one or more wireless transceivers 116. The wireless transceiver 116 may be configured to facilitate communication with tracking devices 118 using wireless protocols such as Bluetooth Low Energy (BLE) or ultra-wideband (UWB). The tracking devices 118 may include key fobs, mobile phones, or dedicated devices that are configured to communicate wirelessly with the wireless transceiver 116 to facilitate identification and positioning of a user. The wireless transceiver 116 may allow the body controller 112 to identify the positions of key fobs, mobile phones, or other devices that may identify users for access to the vehicle 102. In an example, the body controller 112 may unlock doors of the vehicle 102 responsive to detection of an approach of an authorized user via the wireless transceiver 116 (e.g., detected based on increased BLE signal strength or decreasing Radio Frequency Time-of-Flight (RF-ToF) of the approaching tracking device 118).

The location controller 120 may be configured to provide vehicle location information. For example, the location controller 120 may allow the vehicle 102 to receive time and location information from a global navigation satellite system (GNSS) constellation of satellites.

The HMI controller 122 may be configured to receive user input via various buttons or other controls, as well as provide vehicle status information to a driver, such as fuel or charge level information, engine operating temperature information, and current location of the vehicle 102. The HMI controller 122 may be configured to provide information to various displays within the vehicle 102, such as a center stack touchscreen, a gauge cluster screen, etc.

The telematics controller 124, sometimes referred to as a telematics control unit (TCU), may include network hardware configured to facilitate communication between the other vehicle controllers and with other devices of the system 100. The telematics controller 124 may include or otherwise access a modem 126 configured to facilitate communication with other vehicles 102 or with infrastructure. The modem 126 may, additionally, be configured to communicate over a broadcast protocol to facilitate cellular vehicle-to-everything (C-V2X) communications with devices such as other vehicles 102. The telematics controller 124 may be further configured to communicate over various other protocols, such as with a communication network over a network protocol. It should be noted that these protocols are merely examples, and different peer-to-peer and/or cellular technologies may be used.

The vehicle 102 may also make use of various sensors 128 in order to receive information with respect to the surroundings of the vehicle 102. In an example, these sensors 128 may include one or more of cameras (e.g., advanced driver assistance system (ADAS) cameras), ultrasonic sensors, radar systems, and/or lidar systems. The sensors 128 may be used to allow the vehicle 102 to image its surroundings. For instance, camera sensors 128 mounted on the front, rear, and sides of the vehicle 102 may be used to capture visual images of the surroundings of the vehicle 102. These images may be used, for example, to detect the positions of users who are not carrying tracking device 118, to confirm the positions of users who are carrying tracking device 118, to identify the positions of objects surrounding the vehicle 102, etc.

A vehicle bus 130 may include various methods of communication available between the various components of the vehicle 102 discussed herein. As some non-limiting examples, the vehicle bus 130 may include one or more of a vehicle controller area network (CAN), an Ethernet network, and a media-oriented system transfer (MOST) network. The vehicle bus 130 may also be wireless. While a single vehicle bus 130 is illustrated, it should be noted that in many examples, multiple vehicle buses 130 are included, with a subset of the controllers connected to each vehicle bus 130.

The positions of users around the vehicle 102 may be tracked using the tracking devices 118 and/or using the sensors 128 of the vehicle 102. Based on these positions, the speakers 106 may be activated and the closures 108 of the vehicle 102 may be opened or closed or positioned to direct sound to the detected positions of the users.

To determine the correct settings for the speakers 106 and the closures 108, the vehicle 102 may maintain a position mapping 132. The position mapping 132 may include information indicative of how each closure 108, in a variety of positions, will affect the sound emanating from the speakers 106, such as in terms of loudness, clarity, pitch, resolution, or other related sound quality metrics for potential listeners around the vehicle 102 at varying distances. Given the position of the user, the position mapping 132 may accessed to determine the correct closure 108 and speaker 106 settings to direct the sound to the detected user positions. Additionally, or alternately, the vehicle 102 itself may be rotated, oriented, and/or moved to direct the sound to the detected user positions.

Figure 2:
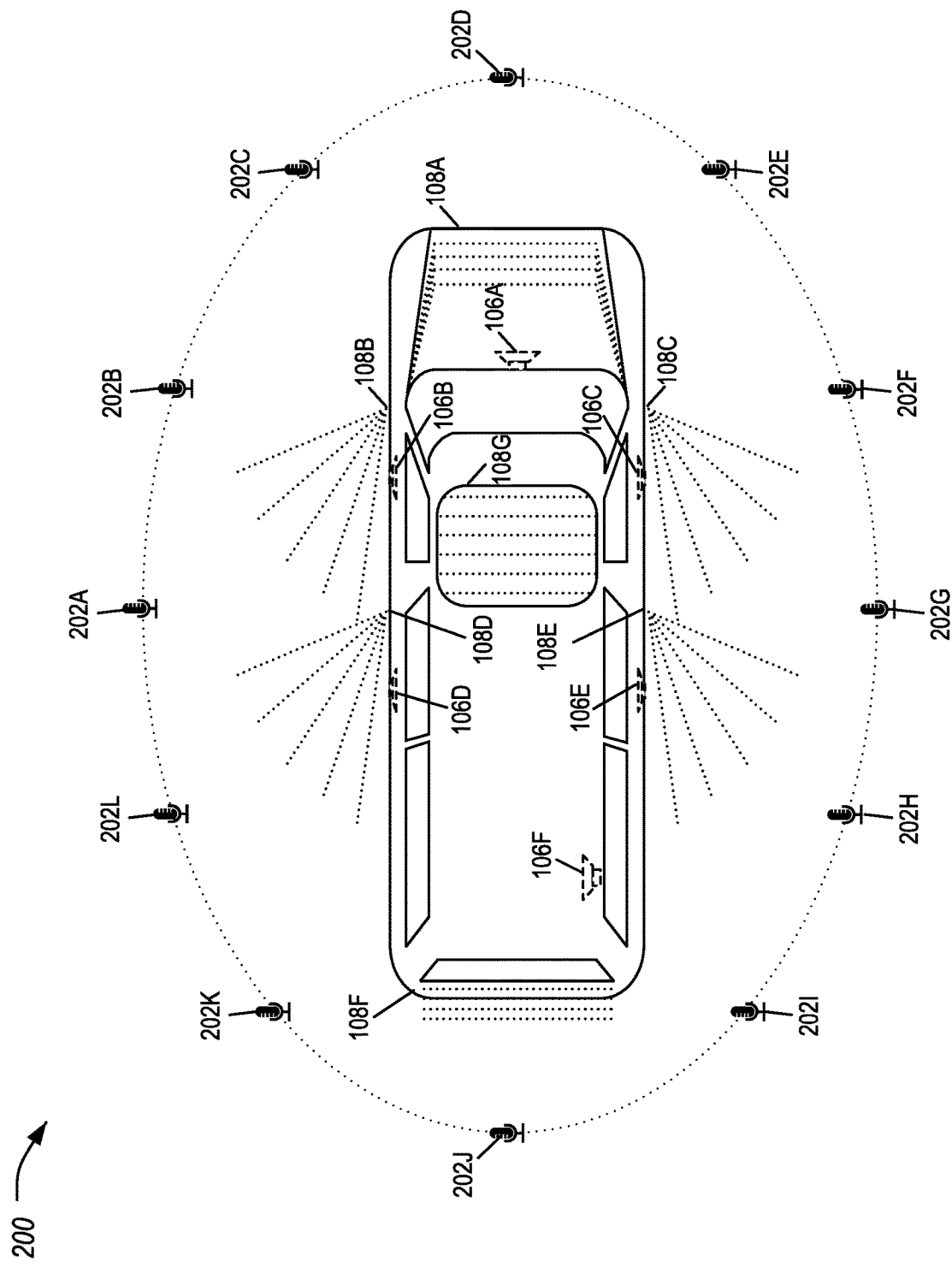
FIG. 2 illustrates an example testing setup for characterizing a vehicle to create the position mapping.

FIG. 2 illustrates an example testing setup 200 for characterizing a vehicle 102 to create the position mapping 132. The vehicle 102 includes a plurality of speakers 106 and a plurality of closures 108. As shown in the example vehicle 102, a first speaker 106A is located in a frunk with a first closure 108A, a second speaker 106B is located in a driver side door closure 108B, a third speaker 106C is located in a passenger side door closure 108C, a fourth speaker 106D is located in a driver side second row door closure 108D, a fifth speaker 106E is located in a passenger side second row door closure 108E, and a sixth speaker 106F is located in a rear cargo area in proximity to a rear liftgate closure 108F. A sunroof closure 108G is also provided in the cab of the vehicle 102. It should be noted that this is only one example of a vehicle 102, and vehicles 102 having more, fewer, and/or differently located speakers 106 and closures 108 are possible. For instance, if the vehicle 102 is a standard cab pickup truck or a coupe, then the vehicle 102 may have only two doors. Or if, the vehicle 102 is a minivan, then the vehicle 102 may have one or more sliding side doors.

One or more testing locations 202 may be used to characterize the sound output of the speakers 106 for various open and closed positions of the closure 108. As shown testing locations 202A-L are placed in an ellipse around a vehicle 102 at a given distance. Signals of a predefined power may be applied to the speakers 106, and testing devices may be used to measure the sound pressure at the different positions of the testing locations 202 (the example testing locations 202 for measurement being represented as microphones for sake of illustration). In an example, the tracking devices 118 themselves may be used as the testing devices. In another example, one or more other mobile devices may be used as the testing devices. In yet another example, one or more microphones or other sound capture devices available at a factory or audio laboratory may be used as the testing devices. It should also be noted that while a plurality of testing locations 202 are shown, a single testing device or multiple testing devise may be used and/or moved to the various different testing locations 202 to perform the testing.

The captured information may be used to characterize the sound output of the vehicle 102. For instance, given one or more predefined power levels to each speaker 106 with the closures 108 closed, the frequency response of the vehicle 102 may be captured at the various testing locations 202. Then, this measurement may be repeated per speaker 106, after changing the positions of the closures 108.

For instance, a sequence of measurements may be taken of each speaker 106B, 106C separately and/or in combination with the driver side door closure 108B and the passenger side door closure 108C in closed positions and the sunroof closure 108G at a plurality of different positions (shown in the FIG. 2 as dotted lines). Similar, a sequence of measurements may be taken of each speaker 106B, 106C separately and/or in combination with the sunroof closure 108G closed and one of the driver side door closure 108B, the passenger side door closure 108C, the driver side second row door closure 108D, the passenger side second row door closure 108E, the rear liftgate closure 108F, etc., at a plurality of different positions. This process may be repeated, as desired, for any and all different combination of speakers 106 and/or closure 108 positions (e.g., opening the sunroof, opening multiple doors, opening the liftgate and a single door). The process may also be repeated after changing the distance between the testing locations 202 and the vehicle 102, to provide information with respect to distance as well.

As the position mapping 132 indicates the sound output at different positions around the vehicle 102 given different combinations of speaker 106 power level and closure 108 position, the position mapping 132 may be used to look up a specific power level at a position around the vehicle 102 to retrieve the speaker 106 power level and closure 108 position settings to use to achieve that result.

In some examples, the information in the position mapping 132 may be extrapolated based on identities such as that doubling of distance reduces the sound level by 6 dB (e.g., to reduce the quantity of distances from the vehicle 102 that are measured). Thus, settings may also be inferred based on the position mapping 132, despite those specific settings not having been recorded to the position mapping 132. In another example, a machine learning model may be trained based on the combinations of speaker 106 power level and closure 108 position closure 108 position and ground truth recorded sound level to infer the correct settings for speaker 106 power level and closure 108 position to use in various situations.

In some examples, the speakers 106 may include add-on speakers 106 connected to power outlets of the vehicle 102. In such a case, performance metrics for the add-on speakers 106 may be communicated to the vehicle 102 (e.g., via the wireless transceiver 116) to allow the vehicle 102 to control the loudness and other parameters of the add-on speakers 106 more accurately. The user may also designate which built-in and/or add-on speakers 106 are to be active to limit energy consumption. In the case where add-on speakers 106 are to be used, the locations of the add-on speakers 106 may also be indicated to the vehicle 102, e.g., based on which power outlet the add-on speakers 106 are connected to, based on user input of the orientation of the add-on speakers 106, etc.

Figure 3:
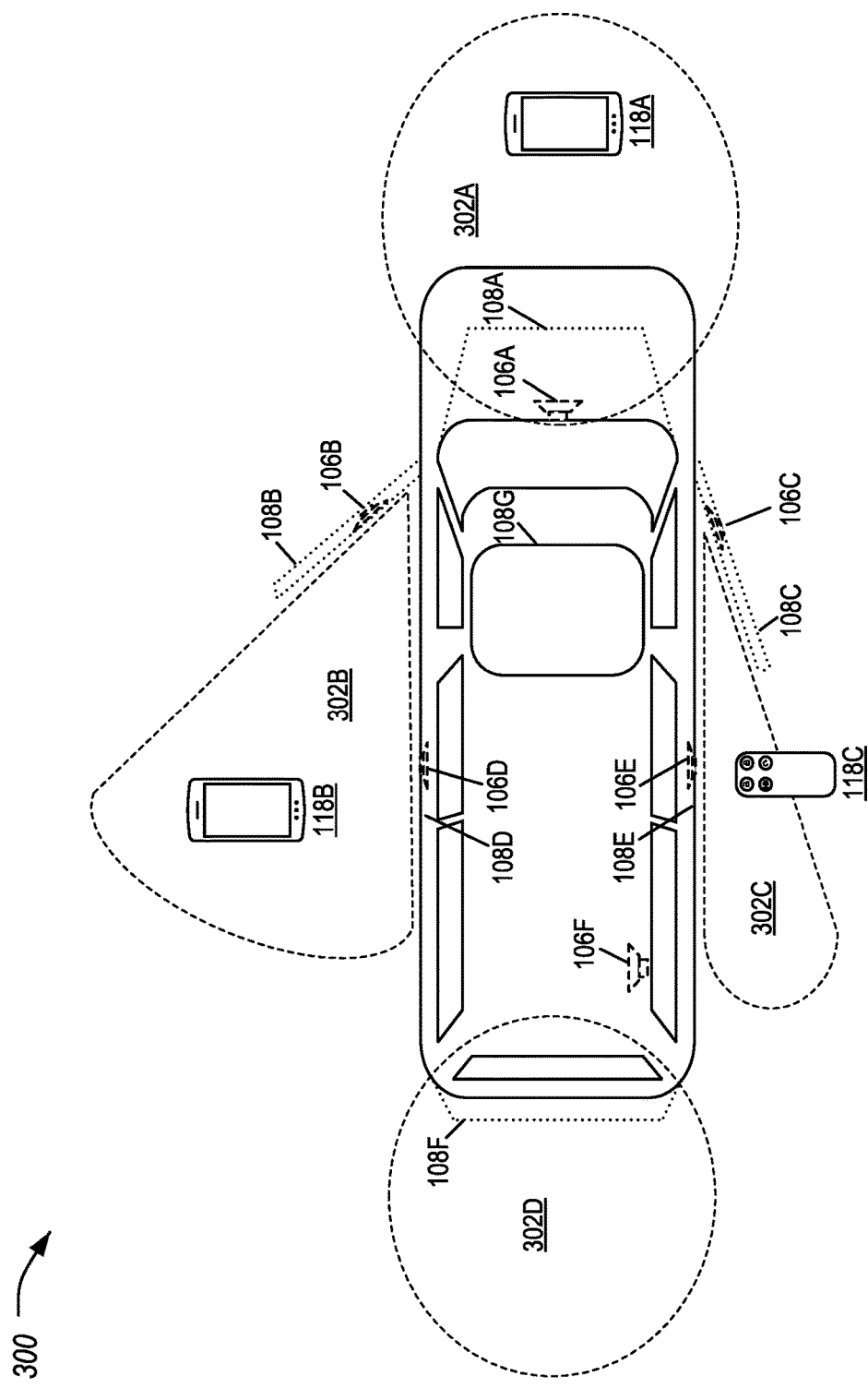
FIG. 3 illustrates an example of operation of the system for providing directional audio features to a plurality of tracking devices at positions around the vehicle.

FIG. 3 illustrates an example 300 of operation of the system 100 for providing directional audio features to a plurality of tracking devices 118 at positions around the vehicle 102. As shown, a first tracking device 118A (e.g., a fob) is located in front of the vehicle 102, a second tracking device 118B (e.g., a phone) is located on the driver side of the vehicle 102, and a third tracking device 118C (e.g., another phone) is located on the passenger side of the vehicle 102.

In an example, the locations of the tracking devices 118A, 118B, 118C may be identified by the vehicle 102 using the wireless transceiver 116. This may be done using various techniques, such as wireless trilateration, ultrasonic audio trilateration, receipt of GNSS coordinates from the tracking device 118 (at least for a coarse positioning depending on available GNSS precision), image recognition of the users using the sensors 128 of the vehicle 102, etc.

Sound may be provided to the users holding the tracking devices 118 based on various settings of the vehicle 102. In an example, the owner of the vehicle 102 may request for the vehicle 102 to play a song, play audio of a sports game, play streamed media content, play a streamed radio station, play a broadcast radio station, etc. This may be done, for example, using the HMI of the vehicle 102, via a request to the vehicle 102 from the user's smartphone (e.g., also the user's tracking device 118), etc. The user may also set a volume to be used to reproduce the audio. This may again be set via the HMI of the vehicle 102 (such as a volume knob), or via the smartphone. Once set, the user may wander around the vehicle 102, and the vehicle 102 may track the user and direct the sound to the position of the user.

As shown, the vehicle 102 is tracking three different tracking devices 118A, 118B, 118C. In one example, the vehicle 102 may use the closest speaker 106 (or speakers 106) to each tracking device 118 to provide audio to that position. For instance, the vehicle 102 may use the speaker 106A and adjust the position of the closure 108A to provide audio to the position of the tracking device 118A, the vehicle 102 may use the speaker 106B and adjust the position of the closure 108B to provide audio to the position of the tracking device 118B, and the vehicle 102 may use the speaker 106C and adjust the position of the closure 108C to provide audio to the position of the tracking device 118C.

It should be noted that, as each of the different tracking devices 118A, 118B, 118C is receiving audio from a different speaker 106, different audio content may be provided to each of the users. For instance, the speaker 106A may provide first audio content to a first sound zone 302A encompassing the position of the tracking device 118A, the speaker 106A may provide second audio content to a second sound zone 302B encompassing the position of the tracking device 118B, and the speaker 106C may provide third audio content to a third sound zone 302C encompassing the position of the tracking device 118C.

In another example, the vehicle 102 may provide audio content to one of the users, while using the remaining speakers 106 to provide white noise to mask the audio content, thereby giving privacy from other potential listeners to the user intended to hear the audio content. As one example, the user of tracking device 118B may wish to use the vehicle 102 to receive audio from a confidential meeting or audio file. In such a case, the speaker 106B and closure 108B may be used to direct the media content to the position of the tracking device 118B, while the other speakers 106A, 106C, 106D may be used to provide white noise surrounding the vehicle 102 to mask the media content provided to the position of the tracking device 118B. For instance, the speaker 106A may be targeted to provide white noise to the position of the tracking device 118A in the first sound zone 302A, the speaker 106C may be targeted to provide white noise to the position of the tracking device 118C in the third sound zone 302C, and the speaker 106F may be generally set to provide white noise to the surroundings in a fourth sound zone 302D without a specific identified target.

Figure 4:
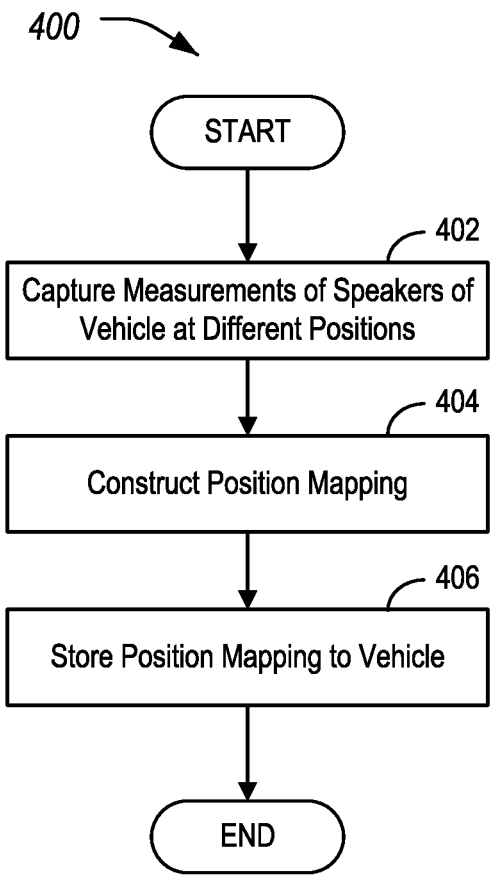
FIG. 4 illustrates an example process for characterizing a vehicle to create the position mapping.

FIG. 4 illustrates an example process 400 for characterizing a vehicle 102 to create the position mapping 132. In an example, the process 400 may be performed by the one or more controllers of the vehicle 102, in the context of the system 100.

At operation 402, the vehicle 102 captures measurements of the speakers 106 of the vehicle 102. These measurements are taken with at different testing locations 202 around the exterior of the vehicle 102, e.g., using various testing devices such as the tracking devices 118, microphones, etc. Signals of a predefined power may be applied to the speakers 106, and the testing devices may be used to measure the sound pressure at the different testing locations 202. The captured information may be used to characterize the sound output of the vehicle 102. For instance, given one or more predefined power levels to each speaker 106 with the closures 108 closed, the frequency response of the vehicle 102 may be recorded. Then, this measurement may be repeated per speaker 106, after changing the positions of the closures 108.

At operation 404, the vehicle 102 constructs a position mapping 132. Based on the captured measurements, the position mapping 132 may include a mapping of sound output at different positions around the vehicle 102 given different combinations of speaker 106 power level and closure 108 position. Thus, the position mapping 132 may be usable to allow the vehicle 102 to look up settings for the speakers 106 and closure 108 positions to direct sound to a location of a user at a predefined loudness. In some examples, the information in the position mapping 132 may be extrapolated based on identities such as that doubling of distance reduces the sound level by 6 dB. Thus, settings may also be inferred based on the position mapping 132, despite those specific settings not having been recorded to the position mapping 132. In another example, a machine learning model may be trained based on the combinations of speaker 106 power level and closure 108 position and ground truth recorded sound level to infer the correct settings for speaker 106 power level and closure 108 position to use in various situations.

In yet another example, for add-on speakers 106 the vehicle 102 may receive a characterization of the properties of the add-on speaker 106 wirelessly from the add-on speaker 106. Or, the vehicle 102 may receive an identifier of a model of the add-on speaker 106, and may download or otherwise access characterization of the properties of the add-on speaker 106 based on the identifier.

At operation 406, the position mapping 132 is stored to the vehicle 102. In an example, the position mapping 132 may be stored to the body controller 112. In another example, the position mapping 132 may be stored to another controller, such as to the audio system 104 itself. After operation 406, the process 400 ends.

Variations on the process 400 are possible. In another example, the capture portion of the process 400 may be performed by a computing device external to the vehicle 102, and the results may be loaded to the vehicle 102 later for use. This loading may be performed during build of the vehicle 102, via an over-the-air update, etc.

Figure 5:
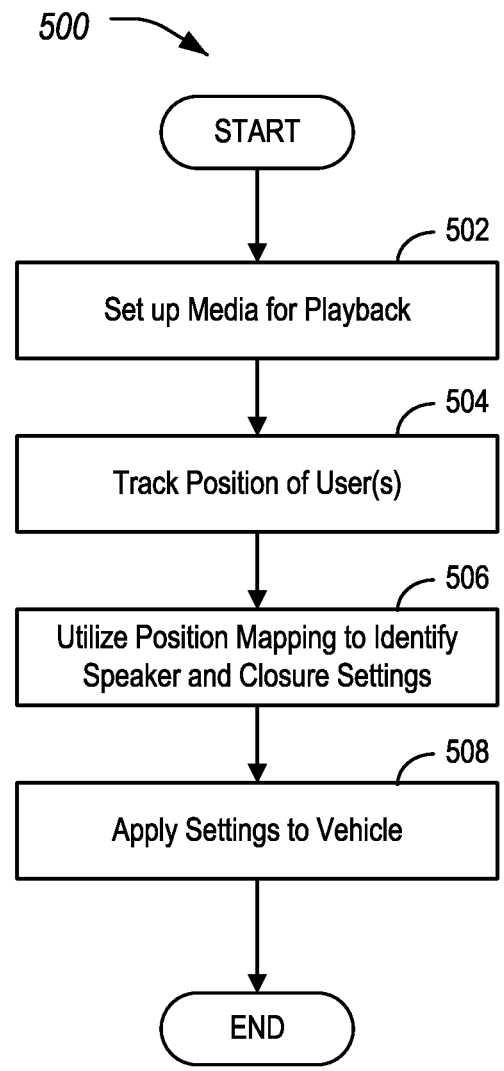
FIG. 5 illustrates an example process for providing directional audio features to tracking devices at positions around the vehicle.

FIG. 5 illustrates an example process 500 for providing directional audio features to tracking devices 118 at positions around the vehicle 102. In an example, the process 500 may be performed by the one or more controllers of the vehicle 102, in the context of the system 100.

At operation 502, the vehicle 102 sets up media content for playback by the vehicle 102. In an example, the owner of the vehicle 102 may request for the vehicle 102 to play a song, play audio of a sports game, play streamed media content, play a streamed radio station, play a broadcast radio station, etc. This may be done, for example, using the HMI of the vehicle 102, via a request to the vehicle 102 from the user's smartphone (e.g., also the user's tracking device 118), etc. The user may also set a volume to be used to reproduce the audio. This may again be set via the HMI of the vehicle 102 (such as a volume knob), or via the smartphone. Once set, the user may wander around the vehicle 102, and the vehicle 102 may track the user and direct the sound to the position of the user.

At operation 504, the vehicle 102 tracks positions of the users. In an example, the locations of the tracking devices 118 may be identified by the vehicle 102 using the wireless transceiver 116. This may be done using various techniques, such as trilateration, receipt of GNSS coordinates from the tracking device 118, image recognition of the users using the sensors 128 of the vehicle 102, etc.

At operation 506, the vehicle 102 utilizes the position mapping 132 to identify speaker 106 and closure 108 settings for the vehicle 102 to play back the media content to the identified positions of the tracking devices 118.

At operation 508, the vehicle 102 applies the settings to the speakers 106 and closures 108 of the vehicle 102. Accordingly, the vehicle 102 applies power levels to the plurality of speakers 106 and positioning to the plurality of the closures 108 to direct sound output from the speakers 106 to the position of the user. After operation 508, the process 500 ends.

Variations on the process 500 are possible. In some examples, the vehicle 102 can use air suspension to tilt the vehicle 102 to improve speaker 106 orientation to the locations of the tracking devices 118. In another example, the vehicle 102 can utilize semiautonomous driving and/or a tank turn steering function to reposition and/or rotate the vehicle 102 such that the more powerful speakers 106 are facing the listeners, e.g., if there is a loud volume audio request. In yet a further example, the vehicle 102 may maneuver or otherwise be repositioned either fully autonomously, semi-autonomously, via suggested remote-control action performed using commands from the user's tracking device 118, and/or by providing a visual indication and/or instruction of the desired location to a display of the vehicle 102 on the user's tracking device 118. These actions may be performed at operation 506 in combination with, or instead of movement of the closures 108.

In another variation, one or more closures 108 may be manually controlled. In such a variation, those closures 108 may not be manipulable by the vehicle 102. In such examples, the position mapping 132 may still be defined to account for these variations. Then, the vehicle 102 can choose the sound levels to apply to the speakers 106 and in which direction to open the automated closures 108 (if any), based on the position mapping 132.

In another variation, one or more closures 108 may be hinged in multiple ways. In such a variation, the closures 108 may be manipulable by the vehicle 102 and/or otherwise positionable in multiple directions. For instance, a station wagon style tailgate may be employed that is side hinged to open as a door and also bottom hinged to open as a tailgate. In another example, a vehicle door may be hinged on either side to open either on the left side or the right side. In yet another example a door may be hinged to open downwards as a tailgate or, in the alternative, in the style of two barn doors hinged at either side opposite. In such examples, the position mapping 132 may be defined to account for these variations. Then, the vehicle 102 can choose in which direction to open the closures 108, in addition to choosing which closures 108 to use, how much to open the closures 108, and the sound levels to apply to the speakers 106.

In an example, the vehicle 102 may be configured to allow sound connection from third parties. In one non-limiting example, a police or other priority user may be able to message the vehicle 102, e.g., via the wireless transceiver 116, to commandeer the audio system 104 of the vehicle 102 for various purposes. The vehicle 102 may also close certain closures 108 and/or warn users if unauthorized individuals are approaching the vehicle 102 and/or a storm is incoming.

In another example, the exterior lighting 114 of the vehicle 102 may be utilized in addition to the directional audio features. In an example, the exterior lighting 114 may be synchronized with the media content being played back to music to provide additional ambiance. For instance, the exterior lighting 114 may be configured to operate as level meters, such that the lighting intensity and/or color corresponds to the relative loudness of the media content being played back. In such an example, the lighting intensity is raised for louder sounds and reduced for quieter sounds (or the reverse) and/or shifted in color (e.g., lower frequencies of light such as red for loudest and higher frequencies of light such as green or blue for quietest, or some other combination of color change). In another example, the exterior lighting 114 may be aimed towards the tracking devices 118 to allow the locations of the users listening to the media content to be observed. In some cases, this feature may be available provided that the vehicle 102 has at least a minimum threshold state of charge, and may be disabled otherwise, to avoid running the battery of the vehicle 102 down due to the power requirements inherent in lighting.

In yet another example, key-off load optimization may be provided in combination with the directional audio features. For instance, depending on which speakers 106 are being leveraged, audio media can be converted from a higher channel representation to a lower channel representation. For instance, surround sound audio may be converted to two-channel stereo or mono to enable only the most effective speakers 106 contribute to providing sound, without a loss of audio quality such as tracks that rely on stereo to introduce different instruments/sounds to the right vs. left.

In another example of key-off load optimization, traditional lighting operating patterns of the vehicle 102 may be altered to reduce electrical load during usage of the directional audio features. For instance, exterior and cabin courtesy lighting may be disabled as is the default during daylight hours. During post-sunset conditions, an overall lighting scheme may be determined by the vehicle 102 through a load arbitration process to allow some light for users while minimizing the load on the electrical system.

In some cases, a feature usage duration may be communicated to the user via the HMI of the vehicle 102 or via an application installed to the user's tracking device 118. This user interface may allow the user to configure their usage based on the duration of intended use of the directional audio features. For instance, the user interface may indicate, based on a measurement of battery state of charge and an estimate of the power draw of the desired lighting and audio features, one or more of: a computed number of minutes that full volume capability plus music synchronized lighting may be supportable given the current battery level, a computed number of minutes that full volume capability without lighting may be supportable given the current battery level, a computed number of minutes that a set volume capability with or without plus music synchronized lighting may be supportable given the current battery level, etc. In another possibility, the user interface may support an auto mode which allows user to specify a desired duration for operation of the directed sound feature and the vehicle 102 may start with full functionality for specific time and taper off features over time to meet the desired duration without dropping below a minimum threshold state of charge.

The vehicle 102 may also use one or more additional load optimization features. For example, the vehicle 102 may disable the heating, ventilation, and air conditioning (HVAC) system while the directional audio features are being used. In another example, the vehicle 102 may disable all HMI chimes while the directional audio features are being used. In another example, the vehicle 102 may set all in-vehicle HMI screens and lighting to a lowest brightness level or to off (e.g., with touch-wake up) while the directional audio features are being used. In another example, the vehicle 102 may slow down sampling of door ajar circuits to conserve power while the directional audio features are being used. In another example, the vehicle 102 may dim or shut off the cabin courtesy lights and/or shut off the cabin lights except for the courtesy lights on or near the open door while the directional audio features are being used.

In yet another example of a variation of use of the directional audio features, the vehicle 102 may rebalance the audio to speakers 106 to help best project the stereo soundstage. For instance, if the sound is being projected from an open driver door, the driver door speaker 106 may be set to deliver sound at a sound pressure level (SPL) below that of the far passenger door that is closed. Otherwise, a stereo effect from the content may be lost.

In another example, the speakers 106 may include body panel speakers 106 which can be employed where an exciter is mounted to the back surface of the body panel and used to communicate sound waves via the body panels themselves. In such an example, the body panels in the direction of the interested audience will be energized to project sound in that direction.

In another example, gesture recognition may be implemented by the vehicle 102 implementing the directional sound features to offer a touch-free user interface. This interface may be available to users of the tracking devices 118. In another example, the interface may be open and offered to people who are passing by or otherwise in the area of the vehicle 102 who either do or do not want to be exposed to the sound. For example, the gestures that are available for controlling the vehicle 102 may include, for example, a first gesture to increase the volume (e.g., raising the user's hand), a second gesture to decrease the volume (e.g., lowering the user's hand), a third gesture to reduce a white noise source (e.g., putting one's fingers in one's ear). This gesture interface may be implemented using data captured by the exterior sensors 128 of the vehicle 102. For instance, the external sensors 128 may capture image data, and image recognition may be performed by the vehicle 102 based on the captured image data to identify the gestures performed by the user. In another example, UWB external sensors 128 may capture wireless device location data (e.g., of a smartwatch or other device of the user, or even of the user directly), and the gesture recognition may be performed by the vehicle 102 based on tracking the location of the device and/or user via UWB.

In another example, vehicles 102 implementing the directional sound features may be used as a paired speaker 106. In such an approach, surrounding vehicles 102 may be employed as additional speakers 106 through an application installed to the user's tracking device 118, where people can employ a parked vehicle 102 to act as a speaker 106, e.g., in exchange for tokens or other compensation. The vehicles 102 may also communicate their position and the position of listeners to one another to allow the vehicles 102 to collectively implement a surround sound experience. For instance, the vehicles 102 on the left side of a parking lot may join together to provide the left channel output while the vehicles 102 on the right side of a parking lot may join together to provide the right channel output. Additionally, using the positions of the vehicles 102, the vehicles 102 may synchronize their outputs for a target user location, e.g., as determined via the tracking device 118, to be synched temporally with the speed of sound through air up based on their distances from the user to create a more immersive experience.

Figure 6:
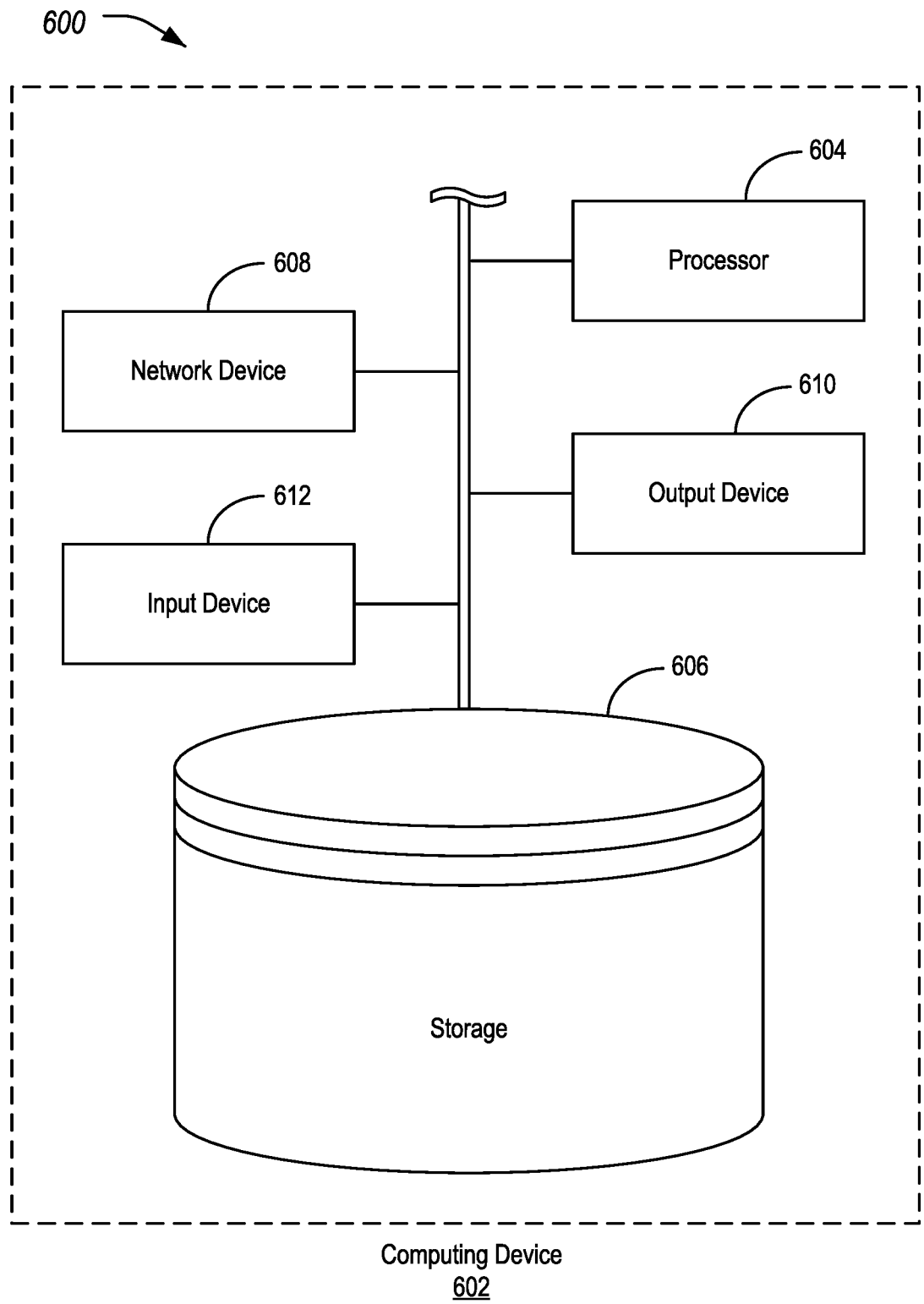
FIG. 6 illustrates an example of a computing device for use in providing directional audio features to positions around the vehicle.

FIG. 6 illustrates an example 600 of a computing device 602 for use in providing directional audio features to positions around the vehicle 102. Referring to FIG. 6, and with reference to FIGS. 1-5, the controllers of the vehicles 102 and the tracking devices 118 may be examples including such computing devices 602. As shown, the computing device 602 includes a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU).

In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices 612 that receive human interface inputs may include keyboards, mice, trackballs, touchscreens, microphones, graphics tablets, and the like.

The network devices 608 may each include any of various devices that enable the vehicles 102 and tracking devices 118 to send and/or receive data from external devices over networks. Examples of suitable network devices 608 include an Ethernet interface, a Wi-Fi transceiver, a cellular transceiver, or a BLUETOOTH or BLE transceiver, an UWB transceiver or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for providing audio to positions around a vehicle, comprising:
   storing a position mapping defining information indicative of how each of a plurality of closures of a vehicle, in a plurality of positions, affects sound emanating from a plurality of speakers of the vehicle at different positions around the exterior of the vehicle;
   tracking respective locations of at least one user outside the vehicle; and
   utilizing the position mapping to apply power levels to the plurality of speakers and positioning to the plurality of the closures to direct sound output from the speakers to the respective locations of the at least one user at a desired volume level.

2. The method of claim 1, wherein the plurality of positions includes a plurality of intermediate positions between an open position and a closed position.

3. The method of claim 1, wherein the plurality of closures includes one or more of a door, a window, a sunroof, a decklid, a liftgate or a tailgate.

4. The method of claim 1, further comprising:
   capturing, using one or more microphones, measurements of sound output received at a plurality of positions around the vehicle from the plurality of speakers of the vehicle over a plurality of different positions of the plurality of closures; and
   constructing the position mapping based on the measurements, such that the power levels to the plurality of speakers and the positioning of the plurality of the closures is indexed according to the plurality of positions and the measurements of the sound output.

5. The method of claim 4, further comprising:
   training a machine learning model, based on combinations of speaker power level, closure position, and the measurements of the sound output as ground truth; and
   inferring the power levels to the plurality of speakers and the positioning of the plurality of the closures using the machine learning model based on the respective locations of the at least one user and the desired volume level.

6. The method of claim 1, further comprising utilizing exterior lighting of the vehicle to operate as level meters, such that lighting intensity and/or color provided by the exterior lighting corresponds to relative loudness of the audio being played back.

7. The method of claim 1, wherein the at least one user includes a first user and a second user, and further comprising using at least a subset of the plurality of speakers to provide white noise to a respective location of the second user to give privacy to the first user.

8. The method of claim 1, further comprising:
   detecting a gesture using sensors of the vehicle; and
   adjusting the desired volume level based on the gesture.

9. The method of claim 1, further comprising repositioning the vehicle in addition to adjusting the positioning to the plurality of the closures to direct the sound output from the speakers to the respective locations of the at least one user at the desired volume level.

10. A vehicle for use in providing audio to positions around the vehicle, comprising:
    one or more controllers, configured to
    store a position mapping defining information indicative of how each of a plurality of closures of the vehicle, in a plurality of positions, affects sound emanating from a plurality of speakers of the vehicle at different positions around the exterior of the vehicle, the plurality of positions including a plurality of intermediate positions between an open position and a closed position,
    track respective locations of at least one user outside the vehicle, and
    utilize the position mapping to apply power levels to the plurality of speakers and positioning to the plurality of the closures to direct sound output from the speakers to the respective locations of the at least one user at a desired volume level.

11. The vehicle of claim 10, wherein the plurality of closures includes one or more of a door, a window, a sunroof, a decklid, a liftgate, or a tailgate.

12. The vehicle of claim 10, wherein the one or more controllers are further configured to:
    capture, using one or more microphones, measurements of sound output received at a plurality of positions around the vehicle from the plurality of speakers of the vehicle over a plurality of different positions of the plurality of closures; and
    construct the position mapping based on the measurements, such that the power levels to the plurality of speakers and the positioning of the plurality of the closures is indexed according to the plurality of positions and the measurements of the sound output.

13. The vehicle of claim 12, wherein the one or more controllers are further configured to:
    train a machine learning model, based on combinations of speaker power level, closure position, and the measurements of the sound output as ground truth; and
    infer the power levels to the plurality of speakers and the positioning of the plurality of the closures using the machine learning model based on the respective locations of the at least one user and the desired volume level.

14. The vehicle of claim 10, wherein the one or more controllers are further configured to utilize exterior lighting of the vehicle to operate as level meters, such that lighting intensity and/or color provided by the exterior lighting corresponds to relative loudness of the audio being played back.

15. The vehicle of claim 10, wherein the at least one user includes a first user and a second user, and the one or more controllers are further configured to use at least a subset of the plurality of speakers to provide white noise to a respective location of the second user to give privacy to the first user.

16. The vehicle of claim 10, wherein the one or more controllers are further configured to:
detect a gesture using sensors of the vehicle; and
adjust the desired volume level based on the gesture.

17. A non-transitory computer-readable medium comprising instructions for providing audio to positions around a vehicle that, when executed by one or more controllers of the vehicle, cause the vehicle to perform operations including to:
store a position mapping defining information indicative of how each of a plurality of closures of the vehicle, in a plurality of positions, affects sound emanating from a plurality of speakers of the vehicle at different positions around the exterior of the vehicle, the plurality of positions including a plurality of intermediate positions between an open position and a closed position,
track respective locations of at least one user outside the vehicle, and
utilize the position mapping to apply power levels to the plurality of speakers and positioning to the plurality of the closures to direct sound output from the speakers to the respective locations of the at least one user at a desired volume level.

18. The medium of claim 17, wherein the one or more controllers are further configured to:
capture, using one or more microphones, measurements of sound output received at a plurality of positions around the vehicle from the plurality of speakers of the vehicle over a plurality of different positions of the plurality of closures; and
construct the position mapping based on the measurements, such that the power levels to the plurality of speakers and the positioning of the plurality of the closures is indexed according to the plurality of positions and the measurements of the sound output.

19. The medium of claim 18, wherein the one or more controllers are further configured to:
train a machine learning model, based on combinations of speaker power level, closure position, and the measurements of the sound output as ground truth; and
infer the power levels to the plurality of speakers and the positioning of the plurality of the closures using the machine learning model based on the respective locations of the at least one user and the desired volume level.

20. The medium of claim 17, wherein the one or more controllers are further configured to one or more of:
utilize exterior lighting of the vehicle to operate as level meters, such that lighting intensity and/or color provided by the exterior lighting corresponds to relative loudness of the audio being played back;
use, when the at least one user includes a first user and a second user, at least a subset of the plurality of speakers to provide white noise to a respective location of the second user to give privacy to the first user; and/or
adjust the desired volume level based on a gesture captured using sensors of the vehicle.

* * * * *